(12) United States Patent
Dressen et al.

(10) Patent No.: US 9,028,183 B1
(45) Date of Patent: May 12, 2015

(54) APPARATUS FOR SECURING THE POSITION OF A BOAT ON A TRAILER

(71) Applicants: John M. Dressen, Dell Rapids, SD (US); Richard L. Dressen, Dell Rapids, SD (US); Larry V. Ottoson, Brandon, SD (US)

(72) Inventors: John M. Dressen, Dell Rapids, SD (US); Richard L. Dressen, Dell Rapids, SD (US); Larry V. Ottoson, Brandon, SD (US)

(*) Notice: Subject to any disclaimer, the term of this patent is extended or adjusted under 35 U.S.C. 154(b) by 0 days.

(21) Appl. No.: 14/486,309

(22) Filed: Sep. 15, 2014

Related U.S. Application Data

(60) Provisional application No. 61/879,836, filed on Sep. 19, 2013.

(51) Int. Cl.
*B60P 7/08* (2006.01)
*B60P 3/10* (2006.01)

(52) U.S. Cl.
CPC .............. *B60P 7/0807* (2013.01); *B60P 3/1066* (2013.01)

(58) Field of Classification Search
CPC ........................... B60P 7/0807; B60P 3/1066
USPC .......... 410/2, 3, 7, 69, 77, 80; 280/414.1, 508; 114/344
See application file for complete search history.

(56) References Cited

U.S. PATENT DOCUMENTS

2007/0086872 A1* 4/2007 Davis .............................. 410/77

* cited by examiner

*Primary Examiner* — Stephen Gordon
(74) *Attorney, Agent, or Firm* — Jeffrey A. Proebl; Woods Fuller Shultz & Smith P.C.

(57) ABSTRACT

An apparatus for selectively securing a boat to a trailer may include a hull contact structure for abutting against the boat hull, and a releasable gripping structure positioned adjacent the hull contact structure to engage the boat's securing loop and selectively lock onto the loop to hold the boat to the trailer.

12 Claims, 6 Drawing Sheets

APPARATUS FOR SECURING THE POSITION OF A BOAT ON A TRAILER

REFERENCE TO RELATED APPLICATION

This application claims the benefit of U.S. Provisional Patent Application No. 61/879,836, filed Sep. 19, 2013, which is hereby incorporated by reference in its entirety.

BACKGROUND

Field

The present disclosure relates to boat trailers and more particularly pertains to a new apparatus for securing the position of a boat on a trailer in a manner more easily accomplished than using known trailer structures.

SUMMARY

The present disclosure relates to an apparatus for selectively securing a boat to a trailer may include a hull contact structure for abutting against the boat hull, and a releasable gripping structure positioned adjacent the hull contact structure to engage the boat's securing loop and selectively lock onto the loop to hold the boat to the trailer.

In another aspect, the disclosure may relate to an apparatus for selectively securing a boat to a trailer, with the boat being of the type having a hull with an outer surface and a trailer securing loop protruding from the outer surface of the hull. The apparatus may comprise a hull contact structure defining a contact surface for abutting against the outer surface of the hull, and a releasable gripping structure positioned adjacent to the hull contact structure. The gripping structure may comprise a pair of jaws movable between a lock position configured to secure the trailer securing loop of the boat and a release position configured to release the securing loop. Each of the jaws may have a perimeter, and the perimeter of each jaw may define a notch positioned in substantial opposition to the notch of the other jaw in the lock position for receiving a portion of the trailer securing loop therebetween. Each jaw may have at least two teeth interlocking with the teeth of the other jaw such that the jaws move in concert. At least one jaw may have an actuator tab positioned adjacent to the notch such that movement of the securing loop between the jaws contacts the actuator tab to move the jaws from the release position toward the lock position. The jaws may form a lock space therebetween. The gripping structure may also include a lock tongue movable between a lock orientation with the lock tongue positioned in the lock space and a release orientation with the lock tongue positioned outside of the lock space. The lock tongue may be biased toward the lock orientation so that movement of the jaws into the lock position permits the lock tongue to move into the lock space and block movement of the jaws from the lock position toward the release position; The gripping structure may also include a release lever connected to the lock tongue to move the lock tongue out of the lock space when actuated.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
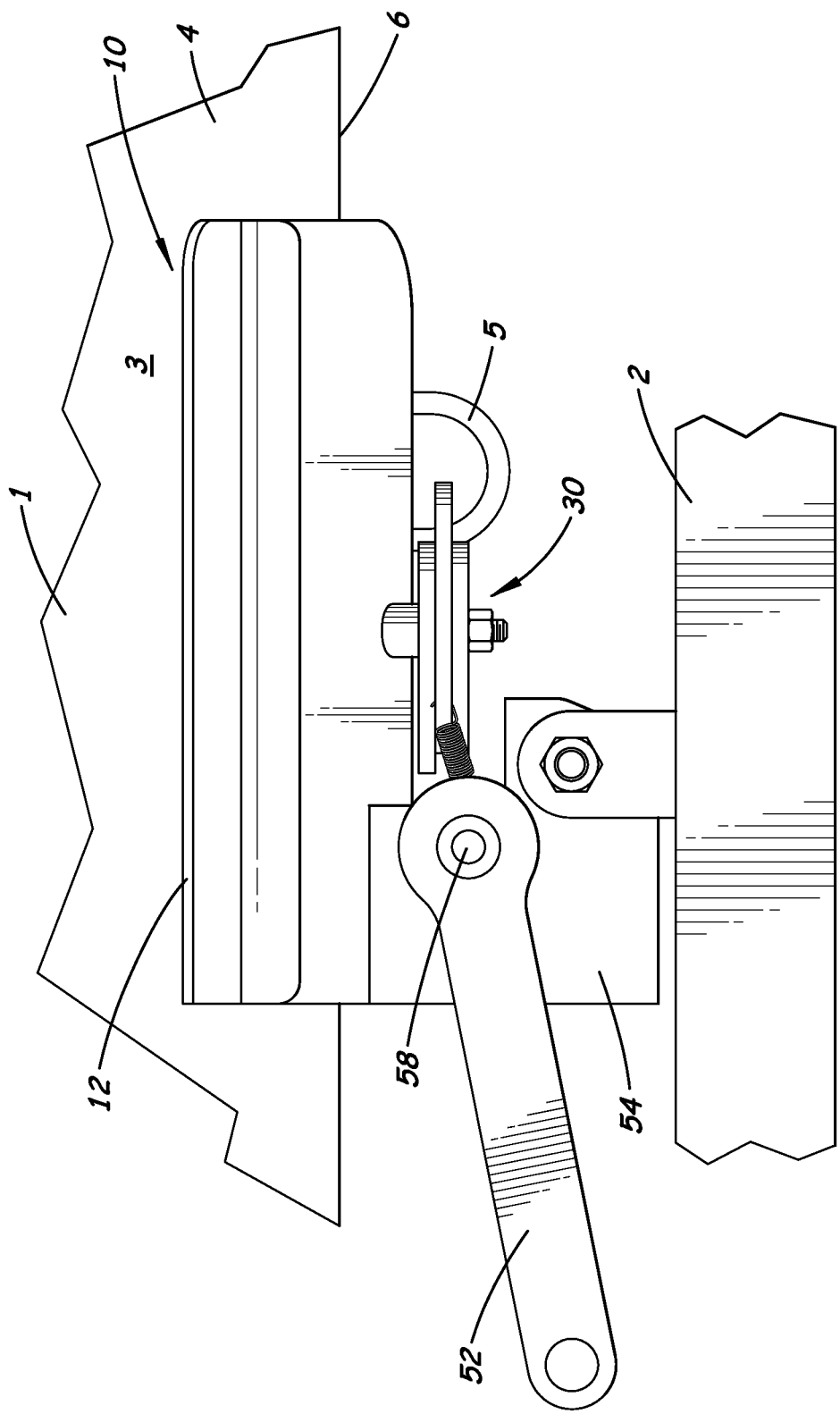
FIG. 1 is a schematic side view of a new apparatus for securing the position of a boat on a trailer according to the present disclosure, shown in relation to the hull of a boat when mounted on a boat trailer.
Figure 2:
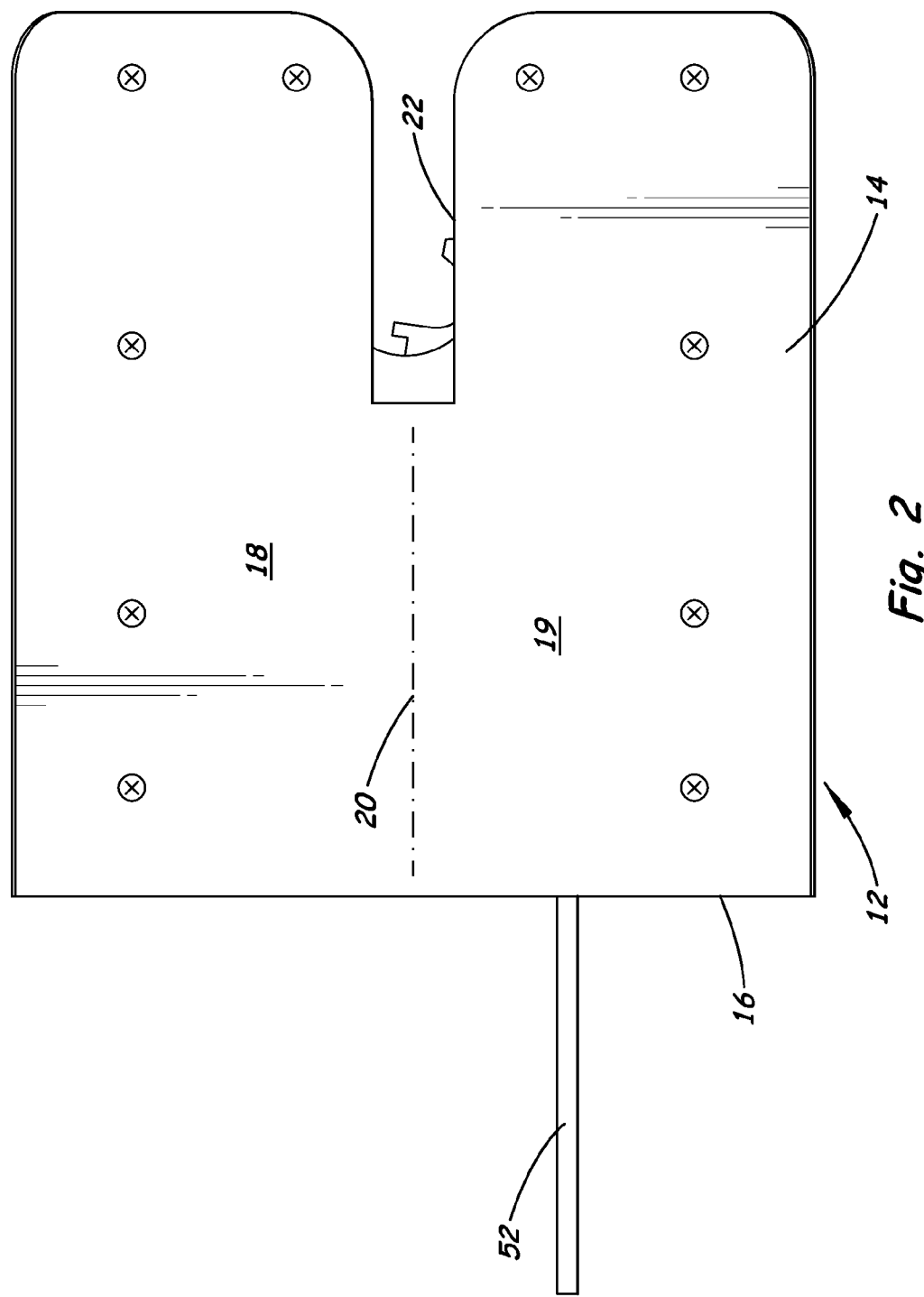
FIG. 2 is a schematic top view of the apparatus, according to an illustrative embodiment.
Figure 3:
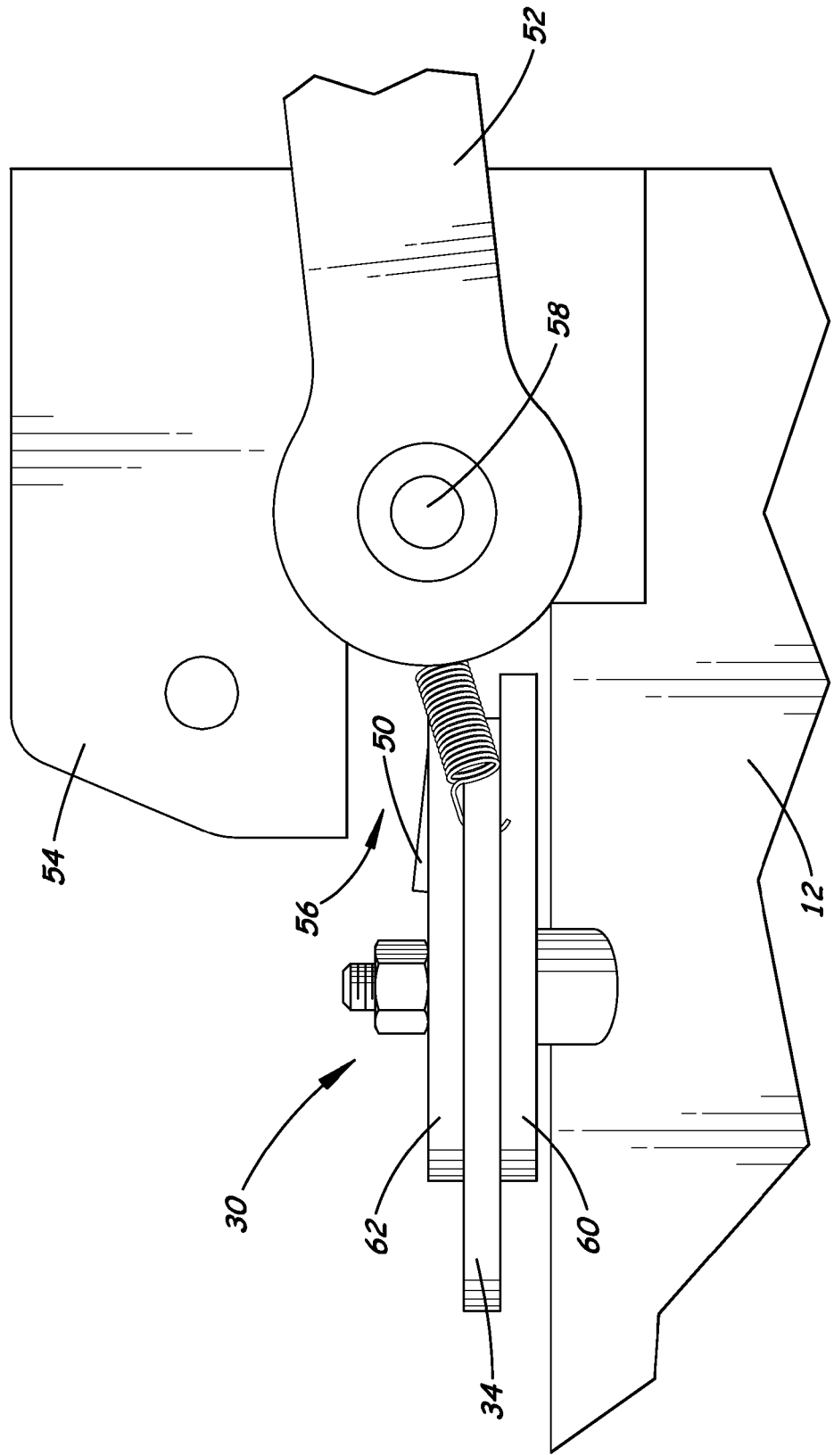
FIG. 3 is a schematic side view of a portion of the apparatus showing detail of the jaws, according to an illustrative embodiment.
Figure 4:
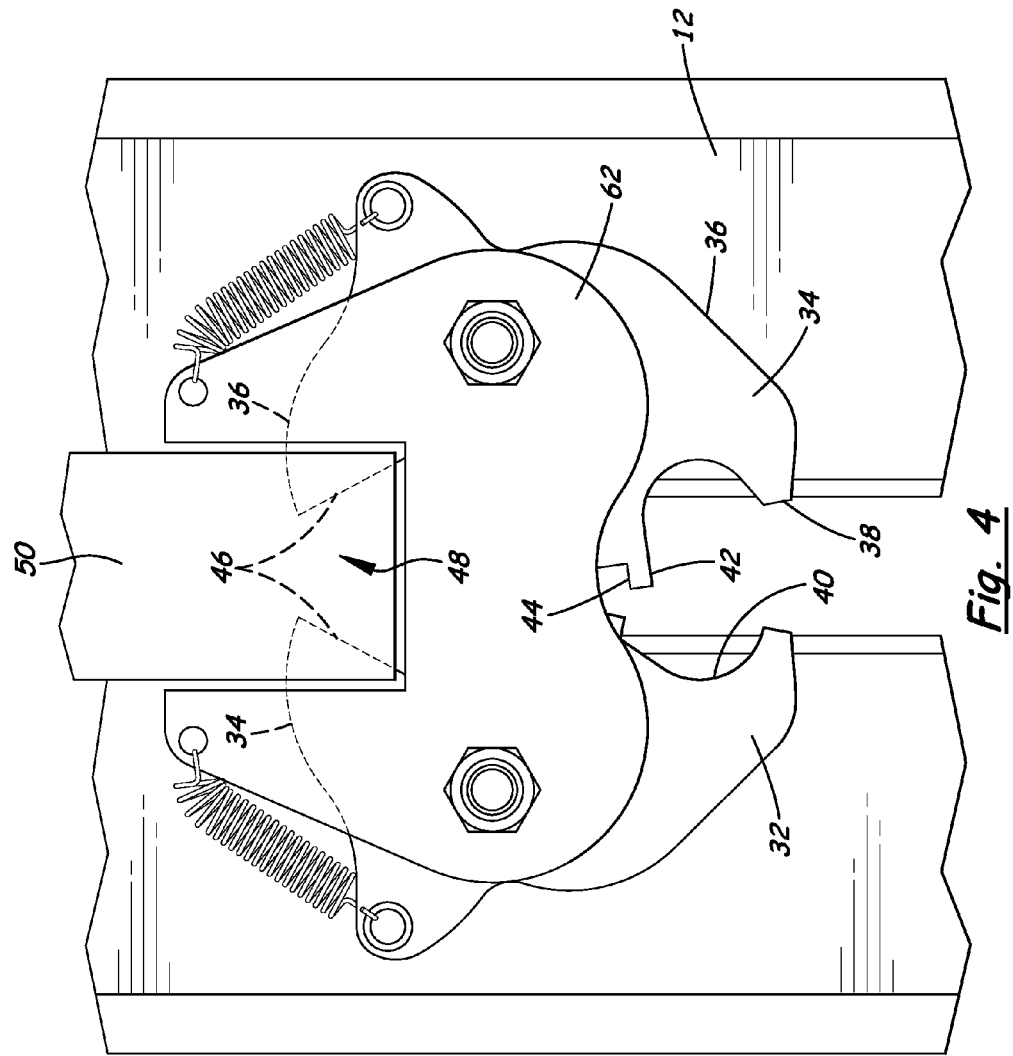
FIG. 4 is a schematic bottom view of the jaws in the release position, according to an illustrative embodiment.
Figure 5:
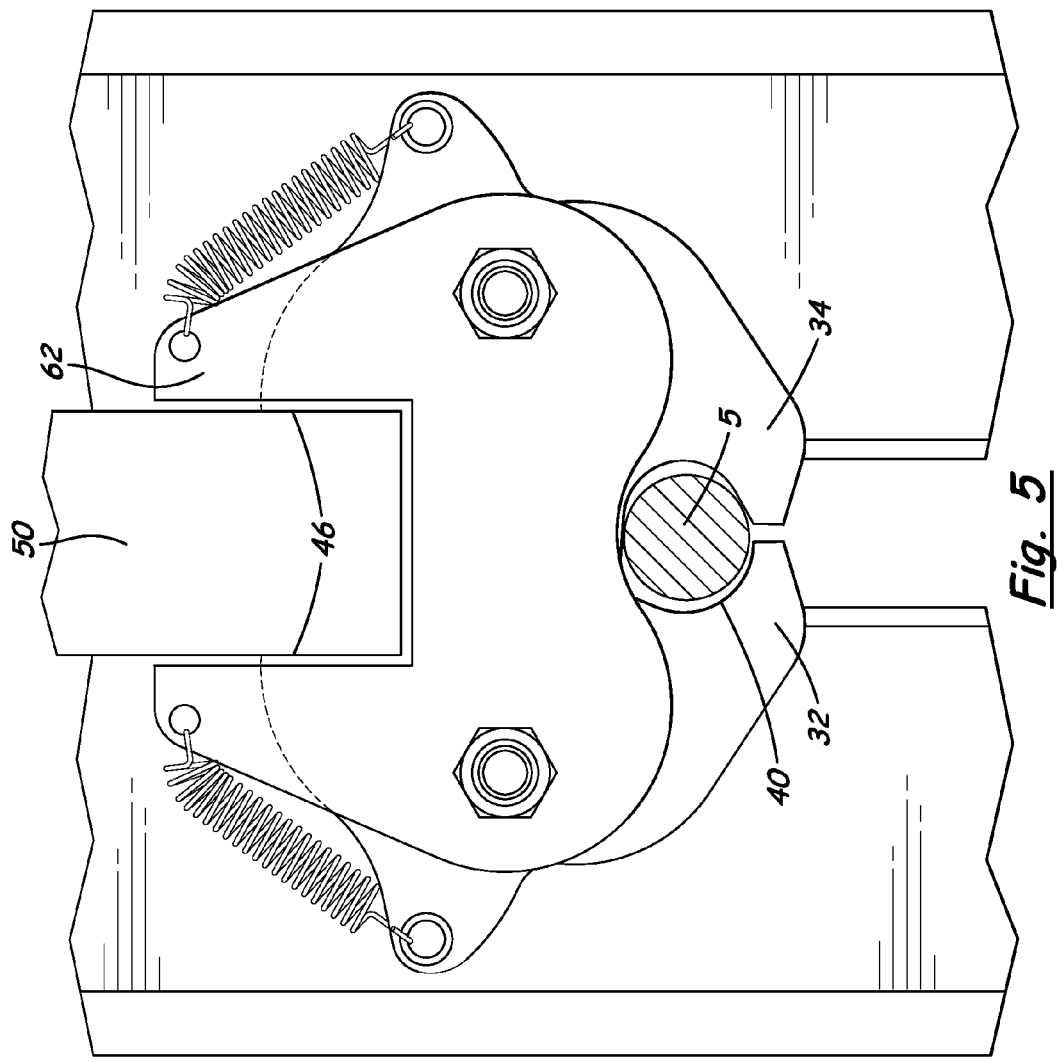
FIG. 5 is a schematic bottom view of the jaws in the locked position, according to an illustrative embodiment.
Figure 6:
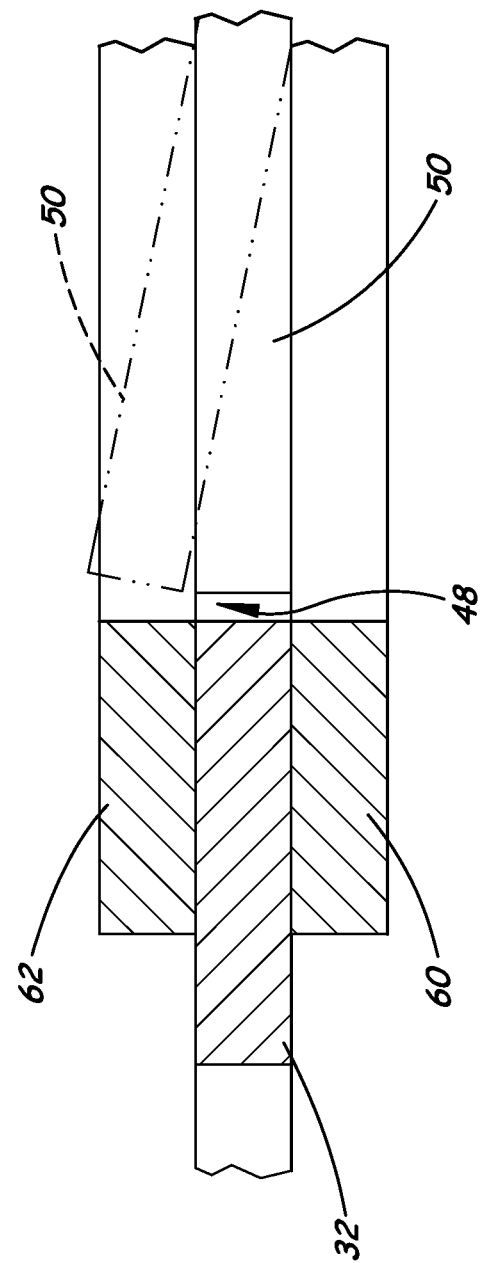
FIG. 6 is a schematic side sectional view of the jaws and tongue of the apparatus in the lock and release orientations.

With reference now to the drawings, and in particular to FIGS. 1 through 6 thereof, a new apparatus for securing the position of a boat on a trailer embodying the principles and concepts of the disclosed subject matter will be described.

The disclosure relates to an apparatus 10 for selectively securing a boat 1 to a trailer 2, and the apparatus 10 may be mountable on the trailer 2. The boat may be of the type having a hull 3 with an outer surface 4 of the hull. A trailer securing loop 5 may be mounted on the hull such that it protrudes from the outer surface of the hull. The hull may have a keel line 6 formed by the convergence of the two major side surfaces of the hull, and the trailer securing loop 5 may be located along the keel line. The apparatus is highly suitable for securing the boat to the trailer when the boat has been substantially fully seated on the various support structures provided on the trailer to support the boat and boat and trailer are in a relationship that is suitable to be towed over the road. On many boat hauling trailers, one or more ears or tabs are provided on the frame toward the front of the trailer, and on the ears is mounted a compressible bumper having a spool shape or a V-shape for engaging the hull at the keel line just above the loop 5 to position the forward end of the boat on the trailer. In some of the more preferred implementations, the bumper may be removed and the apparatus 10 may be mounted on the ears in place of the bumper, and although this facilitates the easy adaptation of the trailer with the apparatus, it is not critical.

In greater detail, the illustrative embodiments of the apparatus 10 may include a hull contact structure 12 that is configured to provide a surface against which the outer surface abuts when the boat is substantially fully seated on the support structure of the trailer. The hull contact surface 12 may include a contact surface 14 for abutting against the outer surface of the hull, and the contact surface may have a periphery 16. The contact surface may include two surface portions 18, 19, with each of the surface portions generally lying in a plane although some contouring of the portions may be present. The planes of the two surface portions 18, 19 may converge at a convergence line 20 for positioning adjacent to the keel line 6 on the hull. The planes of the two surface portions 18, 19 may converge at the convergence line at an angle, and in the most preferred embodiments the angle measures less than 180 degrees. The planes of the two surface portions may converge at an oblique angle, and the angle may be obtuse. A slot 22 configured to receive the trailer securing loop 5 may be formed in the contact surface, and may extend along a portion of the convergence line 20. In some embodiments, the slot 22 may extend from the periphery 16 of the contact surface inwardly, such as toward a center of the contact surface. The contact surface 14 may be formed by a low friction material, such as, for example, an ultrahigh molecular weight (UHMW) material, such as a polyethylene. A support frame 24 may support the material forming the contact surface, and may include a sheet metal material that is suitably formed or contoured.

The apparatus 10 may also include a releasable gripping structure 30 generally positioned adjacent to the hull contact structure 12. The gripping structure 30 may be mounted on the contact structure 12, and may be positioned with respect to the structure 12 opposite of the contact surface 14. The gripping structure 30 may be positioned to engage the trailer securing loop 5 when the loop enters the slot.

The gripping structure may include a pair of jaws 32, 34 for releasably gripping the trailer securing loop 5, and the jaws may be movable between a release position (see FIG. 4) configured to release the loop 5 from the jaws and a lock position (see FIG. 5) configured to secure the jaws to the loop 5 and. The jaws 32, 34 may be pivotable, and may pivot about different axes. Each of the jaws has a perimeter 36, which may define a tip 38 such that the tips of the jaws converge toward each other into the lock position and move away from each other into the release position. The tips may contact each other in the lock position, although this is not critical.

The perimeter 36 of each jaw may also define a notch 40 in a manner so that the notch in one jaw 32 is positioned in substantial opposition to the notch of the other jaw 34 when in the lock position. The notch 40 may be substantially semicircular in shape, although this particular shape is not necessary. The perimeter 36 may define an actuator tab 42 which may be positioned adjacent to the notch 40 and may be positioned on an opposite side of the notch from the tip 38. The perimeter 36 may define at least two teeth 44 on the jaw that are configured to interlock with the teeth of the other jaw such that the jaws move in concert with each other and may move in similar but opposite motions. The teeth 44 may be located adjacent to the actuator tab 42.

The perimeter 36 may further form a lock recess 46 on one jaw that is positioned in substantial opposition to a similar recess 46 on the other jaw. The recesses 46 of the jaws may form a lock space 48 between the jaws, and the lock space may have a first shape when the jaws are in the lock position and a second shape when the jaws are in the release position. The jaws 32, 34 may be biased toward the release position, and a biasing element such as a spring may be connected to each of the jaws to bias the respective jaw toward the release position.

The gripping structure 30 may further include a lock tongue 50 that is movable between a lock orientation (see solid lines in FIG. 6) with the lock tongue 50 being positioned substantially in the lock space 48 and a release orientation (see broken lines in FIG. 6) with the lock tongue positioned substantially outside of the lock space. The lock tongue 50 may have having a shape that generally corresponds to the first shape of the lock space such that the lock tongue is movable into the lock space 48 when the jaws are in the lock position. The lock tongue 50 may be biased toward the lock orientation so that movement of the jaws into the lock position permits the lock tongue to move into the lock space and the tongue blocks movement of the jaws from the lock position toward the release position. The lock tongue 50 may pivot between the lock and release orientations, although this is not critical.

A release lever 52 may be connected to the lock tongue 50 to move the lock tongue with movement of the release lever. The release lever 52 may be configured for being moved by a hand of the user, although a loop may be formed on the lever to permit the lever to be moved by rope or cable or similar element. The release lever may be moved to move the lock tongue out of the lock space 48 to effectively release the jaws 32, 34 from the lock position. The gripping structure may further include a housing 54 which may have an opening 56 through which portions of the jaws may extend from the housing. The release lever 52 may be positioned exterior of the housing. The lock tongue 50 may be mounted on a pivot rod 58 so that the lock tongue pivots on the rod, and the release lever may also be mounted on the rod 58 such that movement of the lever causes movement of the rod, and also the tongue. The pivot rod 58 may be mounted on the housing 54. Also, in some embodiments the housing may be provided with one or more openings for receiving bolts mounting the apparatus 10 to the ears on the trailer frame.

In some embodiments, the gripping structure 30 may include a first support member 60 positioned adjacent to the jaws 32, 34, and the first support plate may be positioned between the jaws and the hull contact structure 12. The jaws may be pivotally mounted on the first support member. A second support member 62 may also be positioned adjacent to the jaws, and the second support member may be positioned on an opposite side of the jaws from the first support member. The jaws 32, 34 may also be pivotally mounted on the second support member. The second support member 62 may have a cutout that permits the lock tongue to move through the member 62 when moving between the lock and release orientations.

In use, the user may install the apparatus 10 in place of, or in addition to, the bumper that is typically supplied with a trailer to position the front end of the boat on the trailer. The boat may be moved forward onto the trailer from a body of water in the usual manner which brings the trailer securing loop 5 toward and into the slot 22 in the hull contact structure 12 and gradually bring the contact surface 14 into contact with the outer surface of the hull. The movement of the loop 5 in the slot brings the loop into contact with the actuator tab of one or both of the jaws, and the continued forward movement presses the loop against the tab or tabs with tends to rotate the jaws from the release position toward the lock position, with the tips moving toward each other until they are in close proximity to each other to move the notches in the perimeter of the jaws to a closed condition. The movement of the jaws to the lock position causes the recesses 46 to form the lock space with the first shape, which in turn permits the tongue to move into the lock space to effectively block further movement of the jaws back towards the release position and effectively locking the loop in the notches of the jaws. Movement of the release lever which in turn moves the tongue out of the lock space allows the jaws to move toward the release position under the biasing force so that the loop may be moved out from the notches or the jaws, and the boat may be moved off of the trailer.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An apparatus for selectively securing a boat to a trailer, the boat being of the type having a hull with an outer surface and a trailer securing loop protruding from the outer surface of the hull, the apparatus comprising:
    a hull contact structure defining a contact surface for abutting against the outer surface of the hull;
    a releasable gripping structure positioned adjacent to the hull contact structure, the gripping structure comprising:
        a pair of jaws movable between a lock position configured to secure the trailer securing loop of the boat and a release position configured to release the securing loop, each of the jaws having a perimeter, the perimeter of each jaw defining a notch positioned in substantial opposition to the notch of the other jaw in the lock position for receiving a portion of the trailer securing loop therebetween, each jaw having at least two teeth interlocking with the teeth of the other jaw such that the jaws move in concert, at least one of the jaws having an actuator tab positioned adjacent to the notch of said at least one jaw such that when the securing loop moves between the jaws it contacts the actuator tab to move the jaws from the release position toward the lock position, the jaws forming a lock space therebetween;
        a lock tongue movable between a lock orientation with the lock tongue positioned in the lock space and a release orientation with the lock tongue positioned outside of the lock space, the lock tongue being biased toward the lock orientation so that movement of the jaws into the lock position permits the lock tongue to move into the lock space and block movement of the jaws from the lock position toward the release position; and
        a release lever connected to the lock tongue to move the lock tongue out of the lock space when actuated.

2. The apparatus of claim 1 wherein the contact surface has a periphery forming a slot configured to receive the trailer securing loop, the jaws of the releasable gripping structure being positioned relative to the slot such that movement of the securing loop into the slot moves the loop between the jaws.

3. The apparatus of claim 1 wherein the contact surface includes two surface portions with each of the surface portions generally lying in a plane, the planes of the two surface portions converging at a convergence line for positioning adjacent to a keel of the hull of a boat.

4. The apparatus of claim 3 wherein the planes of the two surface portions converge at an angle measuring less than 180 degrees.

5. The apparatus of claim 1 wherein the contact surface is formed by a low friction material.

6. The apparatus of claim 1 wherein the gripping structure is mounted on the hull contact structure opposite of the contact surface.

7. The apparatus of claim 1 wherein the jaws are pivotably movable with respect to each other.

8. The apparatus of claim 1 wherein the perimeter of each of the jaws defines a tip, the tips of the jaws converging toward each other while moving into the lock position and moving away from each other while moving into the release position.

9. The apparatus of claim 1 wherein the perimeter of the at least one jaw defines the actuator tab, the actuator tab being positioned adjacent to the notch of the said at least one jaw.

10. The apparatus of claim 1 wherein the perimeter of each jaw forms the teeth of the jaw.

11. The apparatus of claim 1 wherein the jaws are biased toward the release position.

12. The apparatus of claim 1 wherein the gripping structure includes a pivot rod having the lock tongue and the release lever mounted thereon such that movement of the release lever causes movement of the tongue.

* * * * *